April 27, 1965      J. E. STOKER      3,180,739

PACKAGED CAKE AND ICING BRIDGE THEREFOR

Filed March 6, 1963

INVENTOR.
JAMES E. STOKER 3,180,739
PACKAGED CAKE AND ICING BRIDGE
THEREFOR
James E. Stoker, Box 66, East Springfield, Pa.
Filed Mar. 6, 1963, Ser. No. 263,281
1 Claim. (Cl. 99—172)

This invention relates to confectioneries and, more particularly, to devices for protecting cakes and other frosted foods during transportation and storage thereof.

There has always been a problem in transporting foods, especially cakes and other iced and frosted foods, without damaging the frosting thereon. It has been discovered that by providing a toothed cardboard strip with the points thereof inserted into the icing of a cake or the like, the icing can be protected against damage by wrappings such as conventional bores during shipping and transportation thereof.

An example of the boxes contemplated by the invention is the familiar type of cardboard cake box used to carry cakes from bakeries and the like.

It is, accordingly, an object of the present invention to provide an improved wrapping device.

Another object of the invention is to provide an improved icing bridge.

A further object of the invention is to provide an icing bridge which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
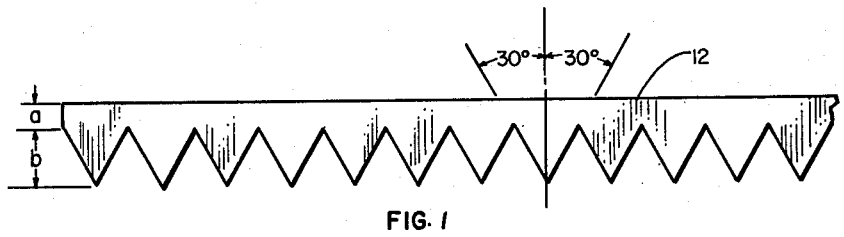
FIG. 1 is an enlarged view of an icing bridge according to the invention.

Now with more particular reference to the drawing, an icing bridge 12 is shown supported on a cake 11 in a package or box 15. The package or box 15 may be of a conventional type and has a suitable cover thereon. The cake 11 may be either round supported in a round box or of some other shape. The box 15 could be rectangular or of other shape.

The cake 11 will have icing 18 on the outer surface thereof. The icing bridge 12 has points 19 which are inserted into the icing 18 of the cake.

The icing bridge 12 is made up of cardboard, metal, or plastic strips which have points which may have sides thereof at approximately a sixty degree included angle and these points extend approximately five-eighths of the way across the strip. The $a$ dimension of the icing bridge may be approximately three-eighths inch and the $b$ dimension may be approximately five-eighths inch.

The points 19, defined by side edges of the 60° included angle referred to above, which converge at an approximately thirty degree angle. These points are inserted on top of the cake and the upper edge surface of the icing bridge may be disposed approximately flush with a top edge 20 of the box 15 or slightly therebelow. Thus, when the cover is put on the box, the icing bridge will protect the icing from damage by the cover.

Figure 2:
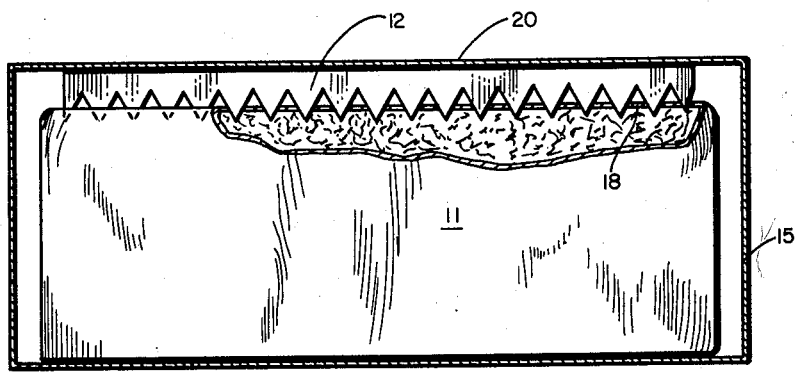
FIG. 2 is a side view of a cake box having the icing bridge inserted in a cake according to the invention.
Figure 3:
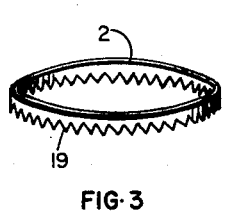
FIG. 3 is a view of a round configuration of icing bridge.
Figure 4:
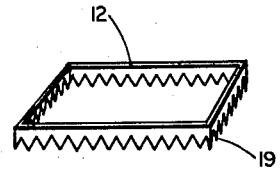
FIG. 4 is an isometric view similar to FIG. 3 of a square type icing bridge.

The embodiment of the invention shown in FIG. 3 is similar to the embodiment shown in FIGS. 1 and 2; however, in the embodiment of FIG. 3, the icing bridge 2 is round with points 19 thereon.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

An icing bridge in combination with a cake having icing thereon and a box therefor,
    said icing bridge being made of a strip of sheet material having points therein,
    said points having approximately a sixty degree included angle therebetween and extending approximately five-eighths of the way across said strip,
    said points being inserted in the upper icing surface of said cake around the peripheral edge thereon with the upper edge of said strip slightly below the inner surface of the cover of said box, whereby said icing bridge will protect the upper icing surface from damage by said cover.

References Cited by the Examiner
UNITED STATES PATENTS

| | | |
|---|---|---|
| 1,994,214 | 3/35 | Frost. |
| 2,106,425 | 1/38 | Grant _____ 99—171 X |
| 2,116,060 | 5/38 | Damrow _____ 99—171 X |
| 2,339,584 | 1/44 | Rice _____ 99—171 |
| 2,452,629 | 11/48 | Bonekamp _____ 99—171 |
| 2,630,915 | 3/53 | Grant. |

A. LOUIS MONACELL, *Primary Examiner.*

HYMAN LORD, *Examiner.*